United States Patent
Haunhorst

(10) Patent No.: US 8,662,108 B2
(45) Date of Patent: Mar. 4, 2014

(54) QUICK CONNECT FLUID COUPLING

(75) Inventor: Gregory A. Haunhorst, Monclova, OH (US)

(73) Assignee: Eaton Corporation, Cleveland, OH (US)

( * ) Notice: Subject to any disclaimer, the term of this patent is extended or adjusted under 35 U.S.C. 154(b) by 309 days.

(21) Appl. No.: 13/030,763

(22) Filed: Feb. 18, 2011

(65) Prior Publication Data

US 2012/0211107 A1    Aug. 23, 2012

(51) Int. Cl.
*F16L 29/00* (2006.01)

(52) U.S. Cl.
USPC ........................ 137/614.01; 251/248

(58) Field of Classification Search
USPC ............ 137/614.01, 614.04, 614.06, 614.11, 137/383, 384.2, 384.4, 385, 864, 865, 866, 137/627.5, 628, 630, 630.14; 251/101–116, 251/149.9, 149.1, 248, 249, 249.5, 250, 251/250.5
See application file for complete search history.

(56) References Cited

U.S. PATENT DOCUMENTS

| | | | |
|---|---|---|---|
| 269,148 A * | 12/1882 | Wise | 137/625.2 |
| 1,758,727 A * | 5/1930 | Wildin | 251/104 |
| 2,016,577 A | 10/1935 | Pearson | |
| 2,178,182 A * | 10/1939 | Mellinger | 137/865 |
| 2,503,618 A * | 4/1950 | Holm | 137/625.11 |
| 2,700,985 A * | 2/1955 | Gleasman | 137/625.11 |
| 2,872,216 A | 2/1959 | Kaiser | |
| 3,159,180 A | 12/1964 | Courtot et al. | |
| 4,271,865 A | 6/1981 | Galloway et al. | |
| 4,335,747 A | 6/1982 | Mitsumoto et al. | |
| 4,429,711 A | 2/1984 | Schomer | |
| 4,438,779 A | 3/1984 | Allread | |
| 4,541,457 A * | 9/1985 | Blenkush | 137/614.06 |
| 4,577,659 A | 3/1986 | Gembus et al. | |
| 4,622,997 A * | 11/1986 | Paddington | 137/614.06 |
| 4,637,640 A | 1/1987 | Fournier et al. | |
| 4,647,082 A | 3/1987 | Fournier et al. | |
| 4,664,149 A | 5/1987 | Fremy | |
| 4,793,637 A | 12/1988 | Laipply et al. | |
| 4,890,643 A * | 1/1990 | Oliver | 137/614.11 |
| 5,033,777 A * | 7/1991 | Blenkush | 285/317 |
| 5,083,588 A | 1/1992 | Truchet | |
| 5,090,448 A | 2/1992 | Truchet | |

(Continued)

FOREIGN PATENT DOCUMENTS

GB    2162270 A    1/1986

OTHER PUBLICATIONS

ISR for PCT/US2012/022480.

*Primary Examiner* — Craig Schneider
*Assistant Examiner* — Craig J Price
(74) *Attorney, Agent, or Firm* — Rader, Fishman & Grauer PLLC

(57) ABSTRACT

A full flow quick connect fluid coupling that reduces spillage using a convex and a concave ball valve mounted each in a separate coupling body that are joined together where the ball valves seal together and are sequentially rotated using one activation lever to first rotate a first ball valve 90 degrees and then rotating a second ball valve 90 degrees using a gear drive mechanism. A handle button release lock and a secondary handle lock ensure that the valves are not opened until the bodies are joined and locked together in sealing engagement. A lock mechanism is used to lock the bodies together and to provide a lock tab that prevents the ball valves from being opened until the lock mechanism is closed.

13 Claims, 7 Drawing Sheets

(56) References Cited

U.S. PATENT DOCUMENTS

| | | |
|---|---|---|
| 5,095,946 A | 3/1992 | McLennan |
| 5,099,883 A | 3/1992 | Maiville |
| 5,188,335 A | 2/1993 | Pettinaroli |
| 5,332,001 A | 7/1994 | Brown |
| 5,402,825 A | 4/1995 | McCracken |
| 5,488,972 A | 2/1996 | McCracken et al. |
| 5,507,313 A | 4/1996 | LeDevehat |
| 5,685,575 A | 11/1997 | Allread et al. |
| 5,735,047 A | 4/1998 | Evans et al. |
| 5,857,663 A | 1/1999 | Evans et al. |
| 5,894,663 A | 4/1999 | Evans et al. |
| 5,915,402 A | 6/1999 | Mitchell, II |
| 6,024,124 A * | 2/2000 | Braun et al. ............. 137/614.03 |
| 6,056,011 A | 5/2000 | Bormioli |
| 6,609,532 B1 | 8/2003 | Peterson |
| 6,681,802 B2 * | 1/2004 | McHugh ...................... 137/613 |
| 6,945,273 B2 * | 9/2005 | Reid ........................ 137/614.06 |
| 6,959,909 B2 * | 11/2005 | Bancroft et al. .............. 251/109 |
| 7,153,296 B2 * | 12/2006 | Mitchell .................... 251/149.9 |
| 7,434,842 B2 * | 10/2008 | Schmidt .......................... 285/91 |
| 7,562,906 B2 * | 7/2009 | Schmidt .......................... 285/91 |
| 8,132,781 B2 * | 3/2012 | Haunhorst ................ 251/149.9 |
| 2005/0012330 A1 * | 1/2005 | Schmidt ........................ 285/317 |
| 2013/0000763 A1 * | 1/2013 | Haunhorst et al. ........ 137/614.01 |

* cited by examiner

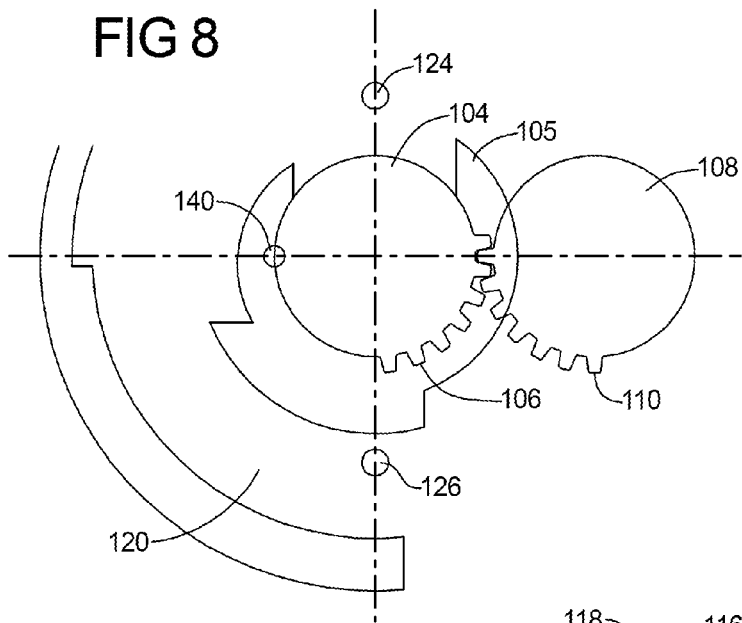
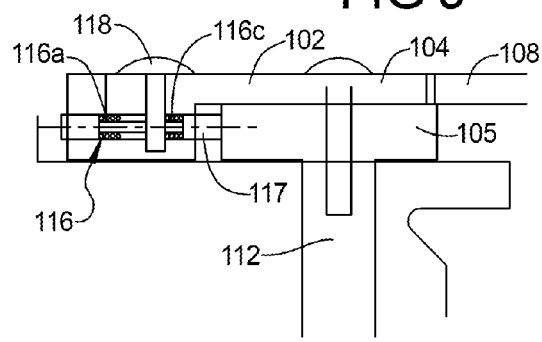
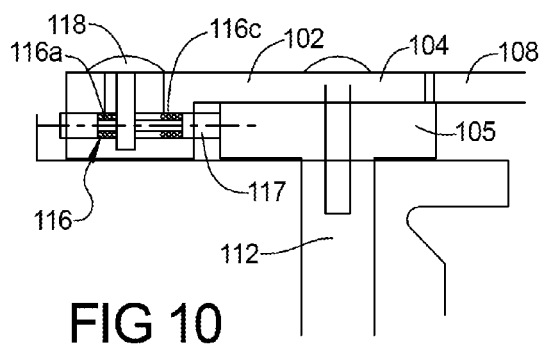

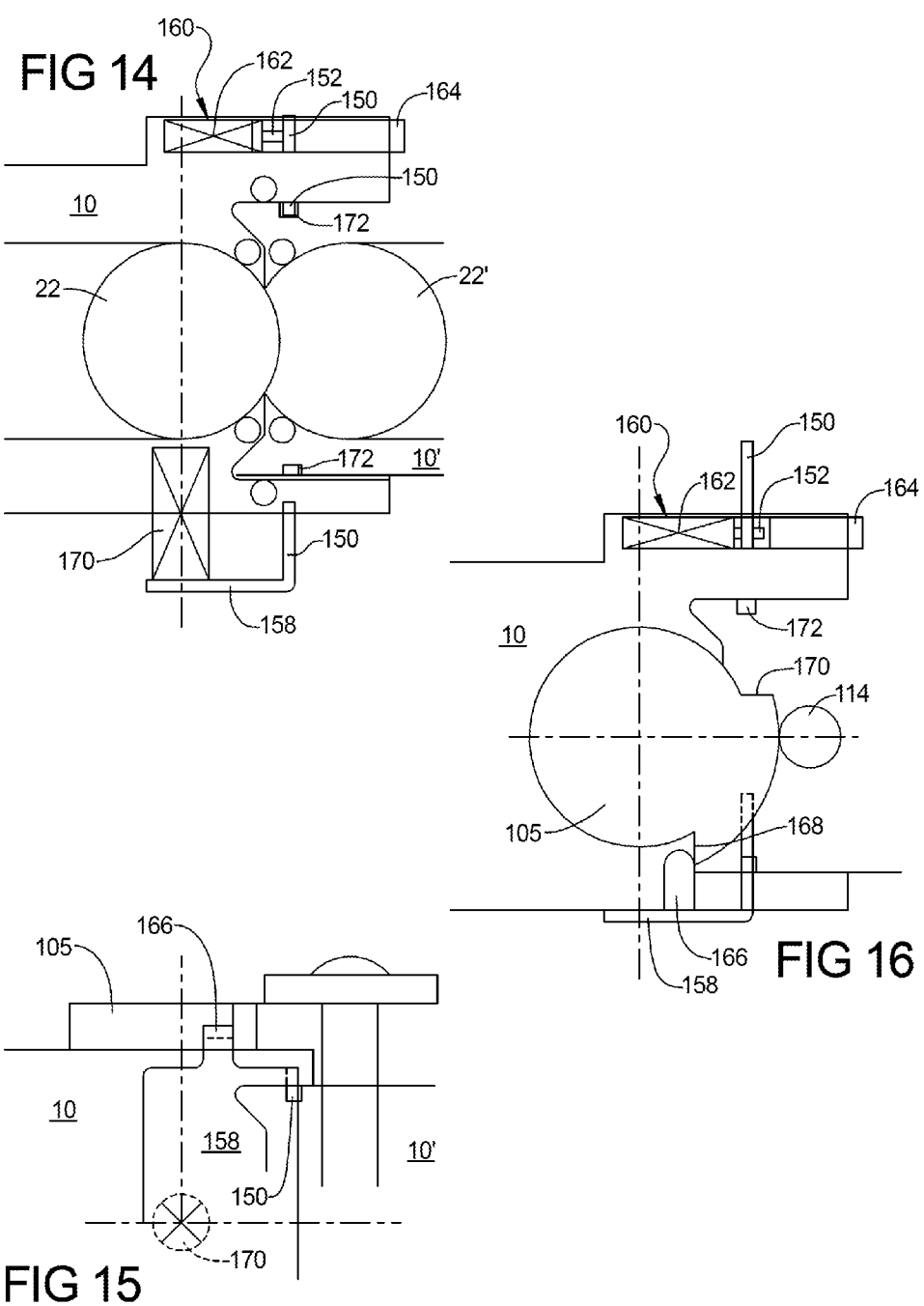

QUICK CONNECT FLUID COUPLING

TECHNICAL AREA

This invention relates to a quick connect fluid coupling that provides opening using a single lever to sequentially open each of two nested ball valves with minimal fluid spillage upon disconnection of the coupling bodies.

BACKGROUND

Fluid couplings known as "dry-break" couplings, such as the type commonly found on the end of flexible hoses often use ball valves. In one prior art example, a separate coupling body for each ball valve holds the ball valve in position which are joined together and held by a locking mechanism then, the ball valves are opened by the sequential rotation of two levers 90 degrees. One ball valve is convex while the second ball valve is concave in one section so that the two ball valves can be nested together to and then can be rotated to either a closed or open position. Closing the ball valves before disconnecting the coupling provides low spillage of the transported fluid. When the coupling bodies are joined together, each ball valve is rotated to a position which permits flow. Before the couplings are separated, each ball valve is rotated to a closed position and the coupling bodies are separated where each ball valve seals a respective coupling body. A concave ball valve and a convex ball valves are used which are interfit together when the coupling bodies are connected so that a minimum volume of fluid is lost when the ball valves are closed and the couplings are separated.

One improvement in ball valve design has been a semi-spherical depression in one ball valve with the other ball valve resting in the depression. This is known as a concave/convex ball valve design. This provides for minimal fluid spillage when the couplings are separated after the conveyance of fluids. One prior art handle or lever design prohibits incorrect sequencing of the ball valves during opening and closing using specially shaped cams formed on the handles. Another prior art feature is a interlocking mechanism to hold the coupling bodies together where a flange is formed on one of the coupling bodies that engages extensions on the second coupling body and a locking pin is activated by one of the handles to prevent disconnection of the coupling bodies once the ball valves are rotated towards an opening position.

In U.S. Pat. No. 5,402,825 to McCracken, a ball valve coupling is disclosed where the ball valves are flattened to provide a sealed fluid path between them. During the time that the coupling is being disconnected, one of the ball valves is axially displaced by a spring thereby allowing the ball valves to be rotated to a closed position. Also disclosed is a latch mechanism which prevents the coupling bodies from being disconnected as long as the ball valves are not in a fully closed position.

In U.S. Pat. No. 5,488,972 to McCracken et al., a ball valve coupling having coupling bodies that are joined and then locked together and the ball valves opened using two handles is disclosed. The handles have geometries that consist of convex and a concave cam portions that interact to prevent the rotation of the second handle until the first handle has been rotated into position. One ball valve includes flat surfaces on the ball and a retainer with flats that correspond to the flats on the ball valve. This feature keeps the ball valve on centerline and allows valve actuation without damage to either ball valve.

SUMMARY

What is disclosed is a quick connect coupling that has a compact size and an easy coupling connection system that uses a spring loaded plate latching mechanism. Importantly, the coupling only requires the rotation of one handle to open both ball valves instead of two handles as with the prior art couplings. This nested ball valve design uses a convex and a concave ball valve, one each in a respective coupling body act to minimize the spillage of fluid once the ball valves are moved to a closed position and the coupling bodies are disconnected. This exemplary quick connect coupling is also known in the art as a "dry break" coupling.

Since the concave and convex ball valve design requires that the opening of the ball valves must be made in sequence, in the exemplary coupling activation mechanism, a section of mating gears is used to open the second ball valve after the first ball valve is opened using a single lever. The ball valves are opened in sequence by rotating the handle 180 degrees in one continuous motion. The rotation of the first ball valve is made directly by the movement of the lever or handle over a 90 degree rotation of the handle and an attached cam drive which is in turn connected to a drive shaft which is connected to the first ball valve. The handle is then disengaged from the cam drive so that the first ball valve stays at the 90 degree open position. A set of gear teeth formed on the drive disc that is directly connected to, or is part of the handle, mesh with gear teeth formed on a driven disc. The driven disc is connected through a driven shaft to the second ball valve. As the handle is rotated an additional 90 degrees, the drive and driven gears mesh to rotate the driven shaft and the second ball valve 90 degrees to its fully open position. A latch mechanism then prevents the couplings from being unlatched until both the ball valves are once again closed by rotating the handle in an opposite direction 180 degrees.

The exemplary coupling includes safety interlocks that perform the following functions: prevent valve opening when the coupling bodies are disconnected, hold the ball valves in either a closed or open position, and prevent disconnection of the coupling bodies when either ball valve is open. When the coupling bodies or halves are disconnected, the handle on one of the coupling bodies is held in the closed position by a tab on the spring loaded latch plate. The other coupling body does not have an actuation handle so the ball valve cannot be opened as long as the coupling bodies remain disconnected. Due to the locking tab portion of the latch plate which interferes with the cam portion of the drive cam, the coupling halves can not be disconnected until the handle is returned to the fully closed position.

After the coupling bodies are connected, the tab in the spring loaded latch plate is retracted and the operator is free to begin rotation of the handle after the latch button located on the handle is slid toward the base end of the handle while the handle is rotated. This action releases the handle check ball from the detent that holds the handle in the fully closed position. The handle locking pin is spring biased toward disengagement from the drive cam, but for the first 90 degrees of the handle rotation, the locking pin is pushed into engagement with the drive cam by the edge wall of the base plate. Thus, during the first 90 degrees of the rotation of the handle, the locking pin locks the handle to the drive cam and the drive shaft so that the convex ball valve will open first. After 90 degrees of rotation of the handle and consequently of the convex ball valve, the shaft ball detent drops into the depression detent in the coupling body to hold the drive shaft and the convex ball valve in the fully open position. At this point, the gear teeth on the drive disc engage the gear teeth on the driven disc such that further rotation of the handle moves the concave ball towards the open position while the convex ball valve is not rotated. Note that the convex and the concave ball valves can be reversed in their relative locations and respective connections to the activation mechanism of this disclosure. Reference to one type of ball valve implies reference to the other type of ball valve and visa versa. The only requirement is that the coupling use one concave ball valve and one convex ball valve and the convex ball must open first and close last.

During further rotation, the locking pin spring is again compressed and when the handle has rotated the full 180 degrees, the locking pin pops out once again. At the same time, the handle ball detent drops into the depression in the body and locks the handle in the wide open position.

To close the ball valves, the handle is rotated in the opposite direction 180 degrees and the following events will occur in order during that rotation of the handle. First the operator must slide the button on the handle toward the drive shaft pivot while rotating the handle which releases the handle ball detent that holds the handle in the open position and it also biases the locking pin toward engagement. During the first 90 degrees of rotation, the engagement of the gears causes the concave ball valve to close first. After the handle is rotated 90 degrees, the locking pin re-engages the drive shaft. At the same time, the pin holding the shaft ball detent in place is depressed thereby releasing the ball detent and allowing the shaft to rotate from the 90 degree position to the fully closed position. Also, at this point, the gear teeth on the handle drive disc disengage the gear teeth on the driven disc so that further rotation does not move the concave ball valve which is now closed. When the handle has been rotated the full 180 degrees back to its initial position, the convex ball is closed (the concave ball is already closed) and the handle ball detent drops into the depression in the body and locks the handle in the closed position and the coupling bodies can be disconnected since the latch plate has also been released from its locked position.

The advantages of the exemplary ball valve coupling will become evident from the following detailed disclosure but primarily include and easy and compact coupling mechanism and a one handle opening and closing mechanism with all of the required safety locks to prevent inadvertent leakage of the fluid being transported.

BRIEF DESCRIPTION OF THE DRAWINGS

FIG. 8 is a partial top plan view showing the handle detent mechanism;

FIG. 9 is a cross-sectional view of the handle locking and detent mechanism with the release button moved inwardly;

FIG. 10 is a cross-section view of the handle locking and detent mechanism with the release button moved outwardly;

FIG. 14 is a top sectional view of the plate latch mechanism in the locked position;

FIG. 15 is a side plan view of the plate latch mechanism in an unlocked position; and FIG. 16 is a top plan view of the drive disc and the plate latch mechanism in an open position.

DETAILED DESCRIPTION

Figure 1:
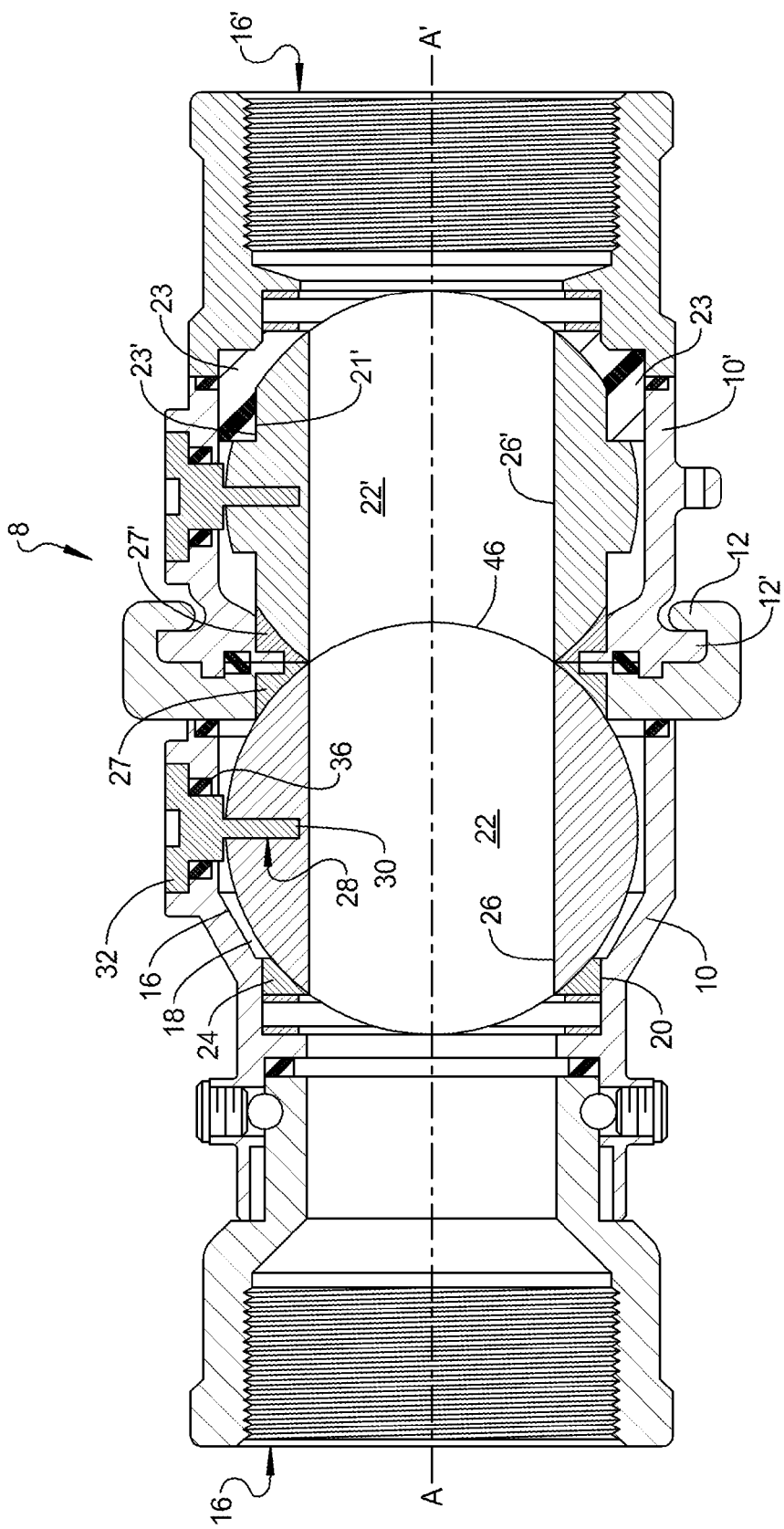
FIG. 1 is a cross-sectional drawing of a prior art ball valve coupling without activation handles.

Referring now to the discussion that follows and also to the drawings, illustrative approaches to the disclosed systems and methods are shown in detail. Although the drawings represent some possible approaches, the drawings are not necessarily to scale and certain features may be exaggerated, removed, or partially sectioned to better illustrate and explain the present disclosure. Further, the descriptions set forth herein are not intended to be exhaustive or otherwise limit or restrict the claims to the precise forms and configurations shown in the drawings and disclosed in the following detailed description.

Moreover, a number of constants may be introduced in the discussion that follows. In some cases illustrative values of the constants are provided. In other cases, no specific values are given. The values of the constants will depend on characteristics of the associated hardware and the interrelationship of such characteristics with one another as well as environmental conditions and the operational conditions associated with the disclosed system.

In this disclosure, certain terminology will be used in the following description for convenience in reference only and will not be limiting. The terms "rightward" and "leftward" will refer to directions in the drawings in connection with which the terminology is used. The terms 'inwardly" and "outwardly" will refer to directions toward and away from, respectively, the geometric center of the ball groove assembly of the present invention. The terms "upward" and "downward" will refer to directions as taken in the drawings in connection with which the terminology is used. All foregoing terms mentioned above include the normal derivatives and equivalents thereof.

Now referring to FIG. 1 of the drawings, a cross-sectional view of a prior art quick connect dry coupling is shown. The coupling bodies 10, 10' are identical in most respects. For this reason identical reference numerals and primers are used where appropriate. The coupling assembly 8 includes annular coupling body 10 having at least one flange 12. The body 10 includes passage 16 which intersects the ends, and an annular valve seat is defined within the passage concentric thereto by spherical surface 18, and a retainer 20. Likewise, the coupling assembly 8 includes annular coupling body 10' having flange projections 12' which engage the flange 12.

A ball valve 22 is rotatably mounted within the passage 16 and includes a spherical exterior surface 24 and a diametrical bore 26 which extends therethrough. As will be appreciated, the valve seat spherical surface 18 and retainer 20 engages the ball valve surface.

Ball valve 22 defines slot 28 which receives head 30 of a ball valve actuation mechanism 32 (partially shown). The wall of body 10 defines seal bore 34 and seal 36. When ball valve 22 and bore 26 are at a position 90 degrees to axis A-A', ball valve 22 is closed. Rotating ball valve 22 and bore 26 clockwise 90 degrees to a position parallel with axis A-A' opens ball valve 22. Bore 26 then is aligned with axis A-A' and permits unrestricted fluid flow through body 10. In a like manner, the valve 22' is contained within the coupling body 10' and is sealed to the coupling body 10' but can be rotated from the open position shown in FIG. 1 to a closed position using the actuation mechanism 32.

The first ball valve 22 includes a spherical exterior surface and the bore 26 extending therethrough which is shown in FIG. 1 in an open position. The activation mechanism 32 (partially shown) includes a means for rotating the first ball valve 22 between this open position when the bore 26 is in alignment with the passage and a closed position when the bore 26 is transversely disposed to the passage. The second annular body 10' defining a passage therethrough, a second ball valve 22' rotatably mounted within the passage, the second ball valve 22' including a spherical exterior surface and a bore 26' extending therethrough, means for rotating the second ball valve 22' between an open position when the bore 26' is in alignment with the passage and a closed position when the bore 26' is transversely disposed to the passage; a means for coupling the annular coupling bodies 10, 10'; and wherein a portion of the spherical exterior surface of the second ball valve 22' includes a flat portion 21' and a portion of a retainer 23 has a flat portion 23' wherein the flats 21', 23' are located adjacent to each other allowing the second ball valve 22' to rotate between the open and closed position, but preventing the second ball valve 22' from otherwise moving in the passage of the second annular coupling body 22'. The second ball valve 22' more preferably has at least two flat surfaces 21' and the retainer has at least two flat surfaces 23' where each flat 23' of the retainer 23 is adjacent a flat 23' on the second ball valve 22'. This design of the concave ball valve 22' and retainer 23 prevents interference with the convex ball valve 22 in the process of connecting the two coupling bodies 10, 10'.

The second ball valve 22' is a concave ball valve and the first ball valve 22 is a convex ball valve, wherein the concave second ball valve 22' has a semi-spherical depression in the spherical exterior surface thereof wherein the convex first ball valve 22 fits inside the semi-spherical depression when the ball valves are in the closed position. Preferably, the first annular coupling body 10' has a coupling end and the retainer 23 is located on the opposite side of the first ball valve 22 away from a coupling end. The passage 16 in the first annular coupling body 10 includes a ball seal 27 that has multiple sealing ribs. Preferably, the ball seal 27 is a circular seal that has two sealing ribs. Typically, the ball seal 27 is located in the passage between the convex ball valve 22 and the coupling body 10 end. The convex ball valve must be first opened by turning the first ball valve 90 degrees. Then the concave ball valve 22' can then be opened to a full 90 degrees opening up fully the central passage 26.

The passage 16' in the second annular coupling body 10' also includes a ball seal 27' that has multiple sealing ribs. Preferably, the ball seal 27' is a circular seal that has two sealing ribs. Typically, the ball seal 27' is located in the passage between the concave ball valve 22' and the coupling body 10' end. The convex ball valve must be first opened by turning the ball valve 90 degrees. First the convex ball valve 22 is opened 90 degrees then the concave ball valve can then be opened to a full 90 degrees opening up fully the central passage 26' for flow of fluid therethrough. Thus, both central passages 26 and 26' are fully open and the fluid can freely flow through both coupling bodies 10, 10'.

To connect the first coupling body 10 to the second coupling body 10' flange projections 12' from the second coupling body 10' are received into recesses formed in the first coupling body 10 then the coupling bodies are rotated 90 degrees along the longitudinal axis so that the flange projections 12' engage the flanges 12. Reception of the projections into the recesses and relative rotation of the coupling halves about their longitudinal axis interlocks the coupling halves with a 90 degree rotation. The 90 degree rotation between the coupling halves must be achieved to produce a fully coupled relationship. Note that this quarter turn "lug and groove" latching mechanism results in a relatively large size package for the complete coupling.

Figure 2:
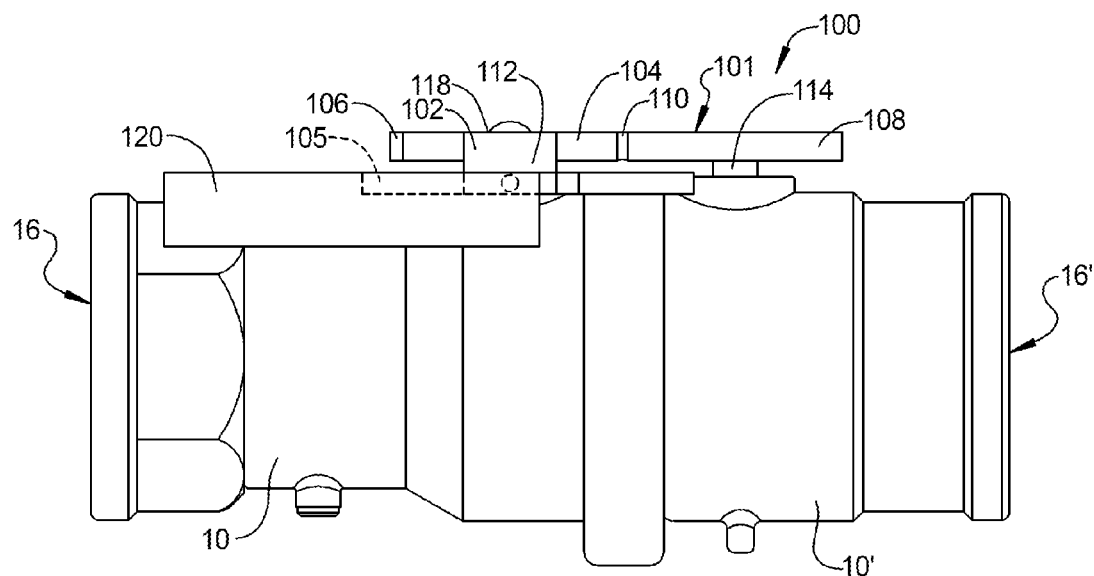
FIG. 2 is a plan view of the exemplary ball valve coupling in a coupled configuration with the ball valves closed.
Figure 3:
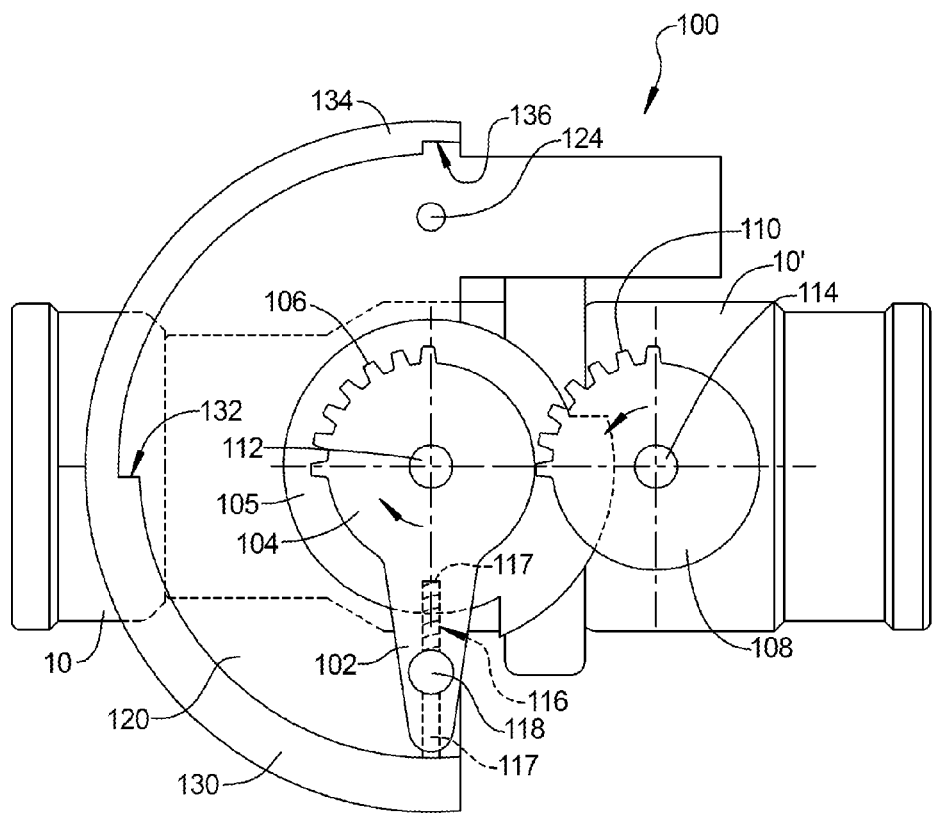
FIG. 3 is a top plan view of the exemplary ball valve coupling of FIG. 2.
Figure 5:
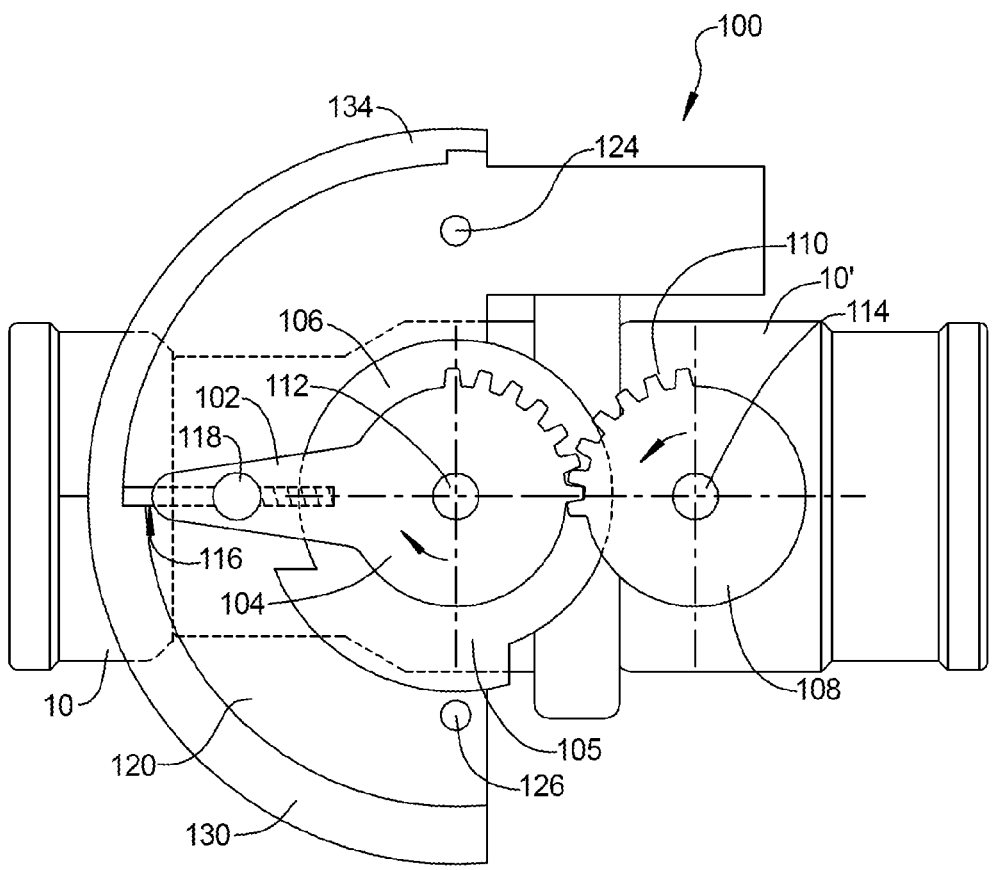
FIG. 5 is a top plan view of the exemplary ball valve coupling of FIG. 4.

Now referring to FIGS. 2 & 3 of the drawings, a front plan view and a top plan view of the improved exemplary quick connect coupling 100 are shown having an exemplary actuation mechanism 101 fitted thereto. The handle 102 is mounted on the first coupling body 10 and is connected to drive disc 104 which has a plurality of drive gear teeth 106 formed on a segment of the outer circumference of the drive disc 104. A driven disc 108 is mounted on the second coupling body 10' and is connected to a driven disc 108 which has a plurality of driven gear teeth 110 formed on a segment of the outer circumference of the driven disc 108 shaped and oriented to initiate meshing with the drive gear teeth 106 when the handle 102 is rotated to a position 90 degrees in a clockwise direction from the position shown in FIG. 3. The drive disc 104 is selectively non-rotatably attached to the drive shaft 112 which is in turn non-rotatably attached to a drive cam 105 and the convex ball valve 22. The handle lock 116 is spring biased to push a locking pin 117 away from the drive shaft 112 and toward the ledge 130 of the base plate 120. The ledge 130 holds the locking pin 117 in position to engage the drive cam 105 which is connected to rotate with the ball valve 22 so that the handle 102 and the attached drive disc 104 rotates with the drive cam 105 for the initial 90 degrees of rotation of the handle 102. After 90 degrees of travel, the handle 102 is released from the drive cam 105 when the locking pin 117 slides outwardly and the first ball valve 22 cannot be rotated past its fully open position as shown in FIG. 5. The fully closed position of the handle 102, the drive cam 105 and the driven disc 108 and hence the fully closed position of the first ball valve 22 and the second ball valve 22' are shown in FIGS. 2 & 3.

To initially rotate the handle 102 from the position shown in FIGS. 2 & 3, the release button 118 must be pushed away from the drive shaft 112 which allows a check ball 122 to be released and move upward so that the handle 102 can be rotated to the full open position 180 degrees from its starting point. This also biases the locking pin 117 toward disengagement from the drive cam 105.

The base plate 120 is mounted to the first coupling body 10 and provides a series of inner surfaces and detents to control the effect of the rotation of the handle 102 and to provide safety latching. Referring specifically to FIG. 3, the base plate 120 is divided into sections which act on the handle lock 116 and on the check ball 122 to link the handle 102 to the drive cam 105 and to the ball valve 22 and lock the handle 102 in one of two positions. The sections include the plate ledge 130, the plate detent 132, the plate tapered edge section 134 and the plate detent 136. There are two detent depressions 124, 126 formed in the base plate 120. The detent check ball 122 is locked into one of these two detent depressions 124, 126 if the release button 118 is released when the detent check ball 122 passes over the detent depression 124 or 126. When the release button 118 is moved in either direction off its neutral position, the check ball 122 is allowed to move upward out of the depression 124 or 126 and the handle 102 can then be rotated. The purpose of the ledges formed on the cam drive 105 is to provide enhanced safety by preventing the coupling bodies 10, 10' from being disconnected when either one of the ball valves 22, 22' are in an open position.

Figure 4:
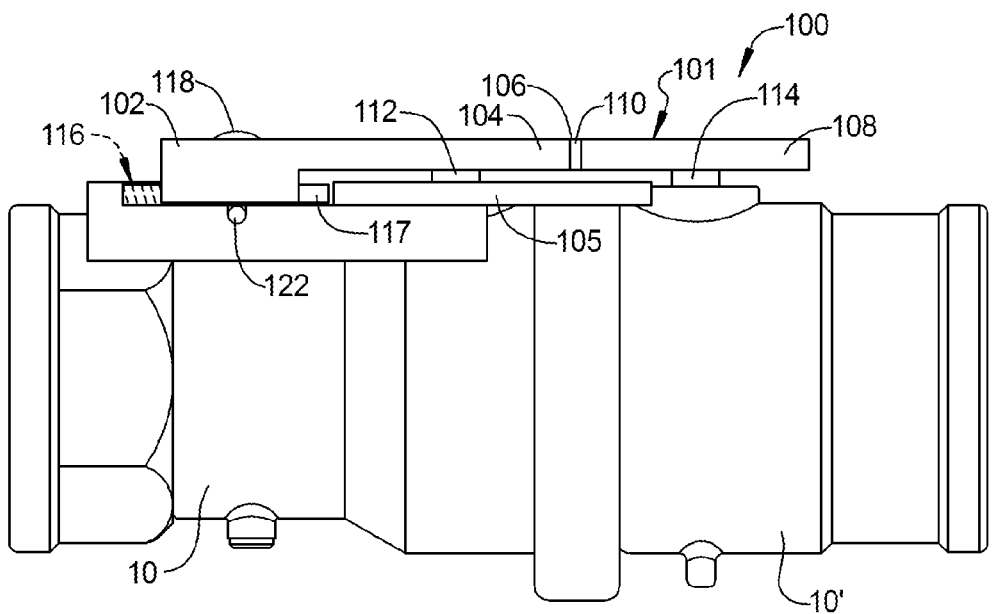
FIG. 4 is a plan view of the exemplary ball valve coupling in a coupled configuration with the first ball valve opened 90 degrees.

Now referring to FIGS. 4 & 5 of the drawings, a front plan view of the exemplary quick connect coupling 100 and a top plan view of the quick connect coupling 100 are shown with the handle 102 rotated 90 degrees from the position shown in FIG. 2. The handle 102 is mounted on the first coupling body 10 and is connected to drive disc 104 which has a plurality of drive gear teeth 106 formed on a segment of the outer circumference of the drive disc 104. A driven disc 108 is mounted on the second coupling body 10' which has a plurality of driven gear teeth 110 formed on a segment of the outer circumference of the driven disc 108 shaped and oriented to initiate meshing with the drive gear teeth 106 when the handle 102 is rotated to a position 90 degrees in a clockwise direction from the position shown in FIG. 3. The drive disc 104 is selectively non-rotatably attached to the drive shaft 112 which is in turn non-rotatably attached to a drive cam 105 and the convex ball valve 22. The handle lock 116 is spring biased to push a locking pin 117 away from the drive shaft 112 and engages the drive cam 105 which is connected to rotate with the ball valve 22 so that the handle 102 and the attached drive disc 104 rotates with the drive cam 105 for the initial 90 degrees of rotation of the handle 102 and at that point the first ball valve 22 is fully opened and cannot be rotated past this point. The fully closed position of the handle 102, the drive cam 105 and the driven disc 108 and hence the fully closed position of the first ball valve 22 and the second ball valve 22' are shown in FIGS. 2 & 3.

To initially rotate the handle 102 from the position shown in FIGS. 2 & 3, the release button 118 must be pushed towards the drive shaft 112 which allows a check ball 122 to be released and move upward so that the handle 102 can be rotated to the full open position 180 degrees from its starting point.

The base plate 120 is mounted to the first coupling body 10 and provides a series of inner surfaces and detents to control the effect of the rotation of the handle 102 and to provide safety latching. Referring specifically to FIG. 3, the base plate 120 is divided into sections which act on the handle lock 116 and on the check ball 122 to link the handle 102 to the drive cam 105 and to the ball valve 22 and lock the handle 102 in one of two positions. The sections include the plate edge 130, the plate detent 132, the plate tapered edge section 134 and the plate detent 136. There are two detent depressions 124, 126 formed in the base plate 120. The detent check ball 122 is locked into one of these two detent depressions 124, 126 if the release button 118 is released when the detent check ball 122 passes over the detent depression 124 or 126. When the release button 118 is moved towards the drive shaft 112, the check ball 122 is allowed to move upward out of the depression 124 or 126 and the handle 102 can then be rotated.

The handle 102 is shown in a position where the convex ball valve 22 has been rotated 90 degrees to a fully open position. At this position the handle lock 116 expands into the plate detent 132 due to the internal spring 116a shown in FIG. 9 so that the pin 117 moves outward and releases the handle 102 from rotating with the drive cam 105 and therefore the drive shaft 112 and the convex ball valve 22. As the handle 102 is continued to be rotated, the convex ball valve 22 does not turn further but since the drive gear teeth 106 are meshed with the driven gear teeth 110 and the driven disc 108 rotates with the handle 102, the driven shaft 114 and the concave ball valve 22' also begin to rotate.

Figure 6:
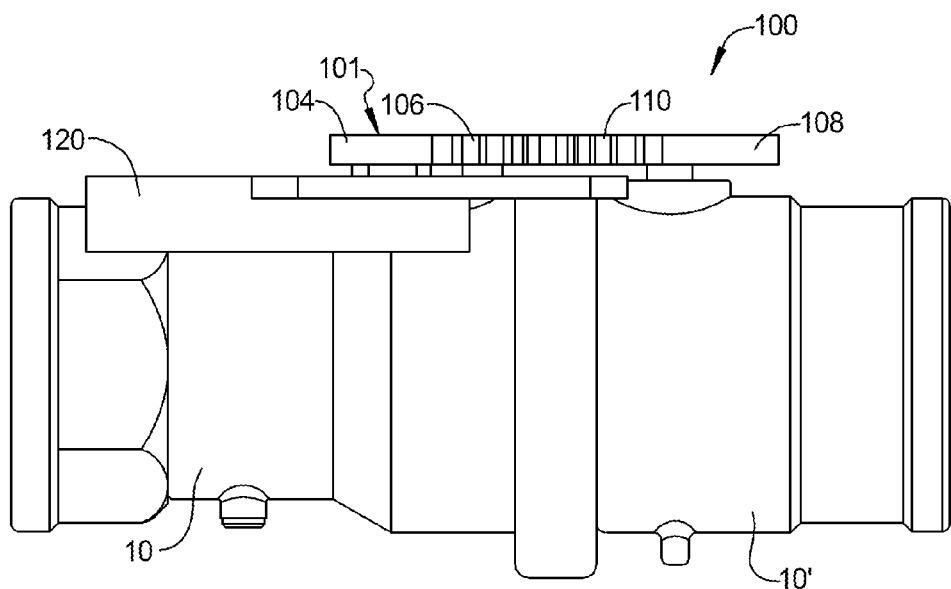
FIG. 6 is a plan view of the exemplary ball valve coupling in a coupled configuration with the first ball valve opened 90 degrees and with the second ball valve opened 90 degrees.
Figure 7:
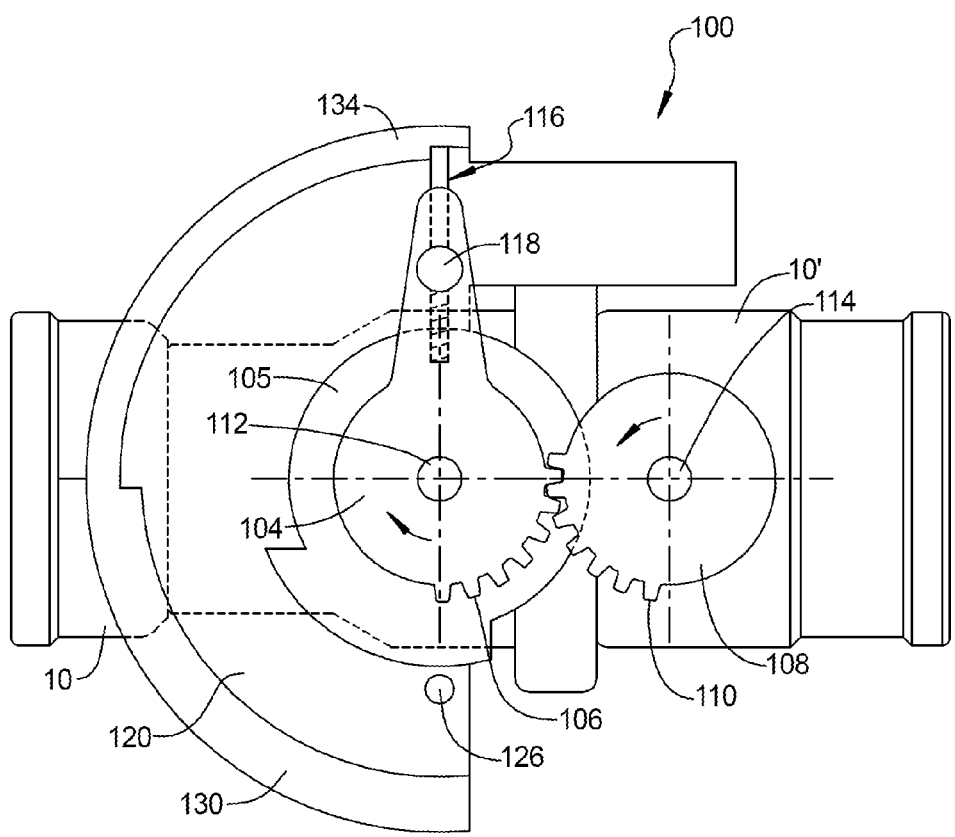
FIG. 7 is a top plan view of the exemplary ball valve coupling of FIG. 6.

Now referring to FIGS. 6 & 7 of the drawings, a front plan view of the exemplary quick connect coupling 100 with the activation mechanism 10' and a top plan view of the quick connect coupling 100 are shown with the handle 102 rotated 180 degrees from the position shown in FIG. 2. In these views, the first and second ball valves 22, 22' are in their full open positions and the coupling 100 is in its full flow configuration. The handle 102 is shown positioned so that the check ball 122 has dropped into the depression detent 124 thereby locking the handle 102 into this position until the release button 118 is again pressed so as to slide the release button 118 towards the drive shaft 112. The driven disc 108 has been rotated to a position 90 degrees from its position shown in FIGS. 3 and 5 (handle has rotated a total of 180 degrees) so that the concave ball valve 22' is now fully open. Thus, both the convex and the concave ball valves 22, 22' are both fully open. The drive gear teeth 106 are meshed with the driven gear teeth 110 and the driven shaft 114 is rotating with any rotation of the drive disc 104 and the handle 102. The handle lock pin 117 has moved outward into the plate detent 136 by action of the biasing spring 116a.

The handle 102 is mounted on the first coupling body 10 and is connected to drive disc 104 which has a plurality of drive gear teeth 106 formed on a segment of the outer circumference of the drive disc 104. A driven disc 108 is mounted on the second coupling body 10' and has a plurality of driven gear teeth 110 formed on a segment of the outer circumference of the driven disc 108 shaped and oriented to mesh with the drive gear teeth 106 when the handle 102 is rotated to a position over 90 degrees in a clockwise direction from the position shown in FIG. 3. The drive disc 104 is selectively non-rotatably attached to the drive shaft 112 which is in turn non-rotatably attached to a drive cam 105 and the convex ball valve 22. The handle lock 116 is spring biased to push a locking pin 117 away from the drive shaft 112 and engages the drive cam 105 which is connected to rotate with the ball valve 22 so that the handle 102 and the attached drive disc 104 rotates with the drive cam 105 for the initial 90 degrees of rotation of the handle 102 but then the locking pin 117 engages a plate detent 132 where it automatically moves outwardly due to the biasing springs 116a, 116c (shown in FIGS. 9 and 10) and releases the handle 102 from the cam drive 105 and hence from the first ball valve 22. The fully closed position of the handle 102, the drive cam 105 and the driven disc 108 and hence the fully closed position of the first ball valve 22 and the second ball valve 22' are shown in FIGS. 2 & 3 while the full open position of the first ball valve 22 and the closed position of the second ball valve 22' is shown in FIGS. 4 & 5.

Now referring to FIG. 8, a top plan view of the exemplary actuation method 142 including the base plate 120 is shown. There are two depression detents 124, 126 formed in the base plate 120. These detents 124, 126 provide locking points for the handle 102 as it is rotated from the closed position to the 90 degree position and then finally to the 180 degree position. The depression detent 140 provides for a separate position hold on the drive cam 105 when it reaches the 90 degree position where a separate check ball (not shown) drops into the depression detent 140 when the handle 102 reaches the 90 degree position where the convex ball valve 22 is fully open. The position shown in FIG. 8 is the one where both of the ball valves 22, 22' are fully open and the handle 102 is straight up. The drive gear teeth 106 are still engaged with the driven gear teeth 110.

Now referring to FIG. 9, a cross-sectional view of the handle 102, the handle lock 116, the release button 118, and the drive cam 105 is shown. In FIGS. 9 & 10 the drive cam 105 is shown as being significantly thicker than the drive cam 105 shown in previous Figures. The release button 118 is shown in a position where it has been pushed to the right toward the drive shaft 112. The movement of the release button 118 towards the drive shaft 112 allows the check ball 122 to move upward and move out of either of the depression detents 124 and 126. The springs 116a and 116c bias the locking pin 117 toward the shaft 112 and into engagement with the drive cam 105.

Now referring to FIG. 10, a cross-sectional view of the handle 102, the handle lock 116, the release button 118, and the drive cam 105 is shown. The release button 118 is shown in a position where it has been pushed to the left away from the drive shaft 112. The movement of the release button 118 away from the drive shaft 112 allows the check ball 122 to move upward and move out of either of the depression detents 124 and 126. The springs 116a and 116c bias the locking pin 117 toward the shaft 112 and into engagement with the drive cam 105.

The release button 118 sits in an elongated slot in the handle 102 and can be moved inwardly or outwardly (right or left). Because there is a compression spring 116a and 116c acting on each side of the release button 118, the release button 118 tends to stay in the center of the slot in a neutral position until it is moved by the operator. In the neutral position, the release button 118 is positioned directly on top of the check ball 122 and when the handle 102 is in its fully closed or fully open positions, the check ball 122 drops into either the closed detent depression 126 or the open detent depression 124 respectively which locks the handle 102 in these positions until the operator slides the release button 118 either way. When the operator slides the release button 118 outwardly as shown in this Figure, in preparation to open the coupling ball valves 22, 22', the release button 118 compresses spring 116a which biases the locking pin 117 toward disengagement from the drive cam 105. At the same time, the check ball 122 is free to move up and out of the detent depression 126 and the handle 102 can be rotated. Once the handle 102 is rotated slightly, the check ball 122 is held up by the base plate 120 and the check ball 122 then prevents the release button 118 from moving back into the neutral position thereby, maintaining the spring 116a bias toward the disengagement position. When the handle 102 has been rotated 180 degrees to the fully open position, the check ball 122 drops into detent depression 124 and the release button 118 pops back to the neutral position thereby locking the handle 102 in the fully open position.

Figure 11:
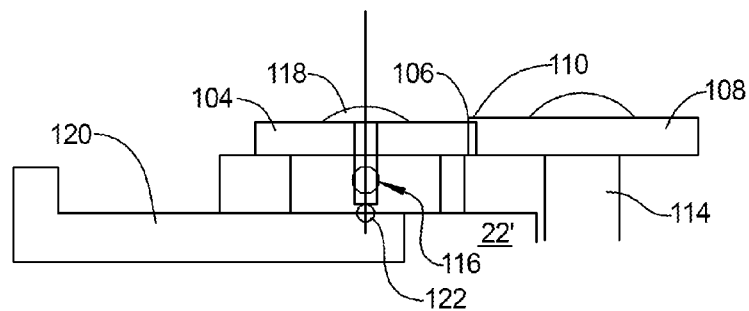
FIG. 11 is a cross-sectional view of the handle locking and detent mechanism of FIG. 10.

Now referring to FIG. 11, a cross-sectional view of the drive disc 104 and the driven disc 108 in a position where the drive gear teeth 106 are meshed with the driven gear teeth 108 is shown. The handle lock 116 is shown as well as the check ball 122 so that the locking pin 117 is pulled out of the cam drive 105 and there is no rotational connection between the handle 102 and the first ball valve 22.

To close the ball valves 22 and 22', the operator slides the release button 118 inwardly and this biases the locking pin 117 toward re-engagement with the drive cam 105 by compressing spring 116c. Again, once the handle 102 is rotated slightly, the check ball 122 holds the release button 118 in this position until the ball valves 22, 22' are fully closed.

Figures 12, 13:
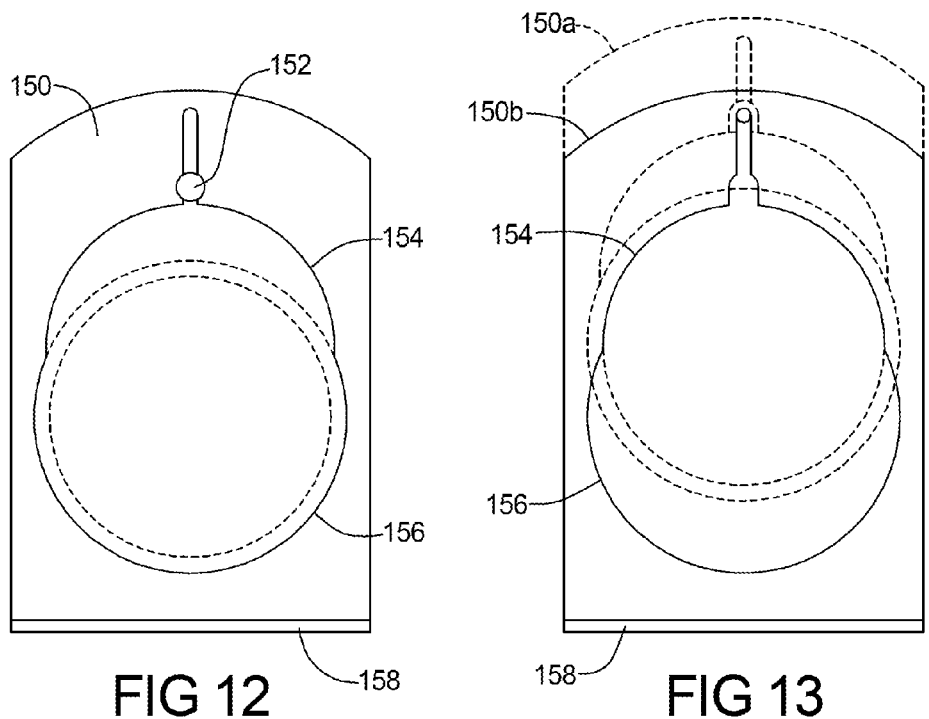
FIG. 12 is a front plan view of the plate latch mechanism in the unlocked position.
FIG. 13 is a front plan view of the plate latch mechanism in the locked position.

Now referring to FIG. 12, a front plan view of the latch plate 150 in an open position is shown. The purpose of the latch plate 150 is to lock the two coupling bodies 10, 10' together and to prevent the first ball valve 22 from being opened until the two coupling bodies 10, 10' are locked together. The latch plate 150 is mounted to the coupling body 10 and is spring loaded towards a latched position and must be pushed into the open position as shown in FIG. 12 to cock it for later joining or disconnection of the coupling body 10'. A larger diameter opening 156 is sized to accommodate the connector body 10' when the latch plate 150 is cocked into the position shown in FIG. 12 where the holding pin 152 has been extended into the pin opening formed in the latch plate 150 to hold it in the cocked position where the mating coupling body 10' can be inserted through the opening 156. Then the holding pin 152 will be retracted and the latch plate 150 will move downward so that the smaller diameter opening 154 engages the coupling body 10' to lock it to the coupling body 10.

Now referring to FIG. 13, a front plan view of the latch plate 150 in a closed, latched position is shown. The latch plate 150 is mounted to the coupling body 10 and is spring loaded towards this latched position and must be pushed into the open position as shown in FIG. 12 to cock it for later joining or disconnection of the coupling body 10'. A larger diameter opening 156 is sized to accommodate the connector body 10' when the latch plate 150 is cocked into the position shown in FIG. 16 where the holding pin 152 has been extended into the pin opening formed in the latch plate 150 to hold it in the cocked position where the mating coupling body 10' can be inserted through the opening 156. As shown in FIG. 13 the holding pin 152 has been retracted and the latch plate 150 will move downward into the position shown so that the smaller diameter opening 154 engages the coupling body 10' to lock it to the coupling body 10.

Now referring to FIG. 14, a top cross-sectional view of the plate latch mechanism is shown in the latched position. The convex ball valve 22 is shown adjacent to the concave ball valve 22' and the coupling body 10 is mated to the coupling body 10' and held in position using the exemplary plate latch 150 which has been moved to the latched position of FIG. 13 and FIG. 14. The plate latch 150 has engaged a latch groove 172 formed in the coupling body 10' where the smaller diameter opening 154 of the latch plate 150 has engaged the latch groove 172 to hold the coupling body 10 into the coupling body 10'. The latch pin 152 is part of the latch pin mechanism 160 and includes a bias spring 162 and a push button 164. The bias spring 162 pushes the latch pin 152 towards the pin opening in the latch plate 150 whereas the push button 164 moves the latch pin 152 away from the pin opening. Referring to FIG. 14, to cock the latch plate 150 into the open position, the latch plate 150 is pushed upward using the push tab 158 which compresses bias spring 170. When the latch plate 150 is moved fully upward (and into the position shown in FIG. 16), the latch pin 152 is pushed into the pin opening in the latch plate 150 thereby holding it in the open position. Once the coupling body 10' is inserted into the coupling body 10, the push button 164 is depressed by the body 10', thereby releasing the latch pin 152 from the latch plate 150 and the latch plate 150 is then pulled downward by the bias spring 170 and into the lock position shown in FIG. 14.

Now referring to FIG. 15, a side plan view of the latch plate 150 mounted to the coupling body 10 is shown. The push tab 158 is biased outward away from the coupling body 10 by bias spring 170. A stop tab 166 extends to contact the drive cam 105 when the push tab 158 is pushed inward to open and cock the latch plate 150. The stop tab 166 extends to stop the rotation of the drive cam 105 and the convex ball valve 22 from being rotated to an open position when the coupling bodies 10, 10' have not been latched together.

FIG. 16 is a top plan view of the latch plate 150 of FIG. 15 where the latch plate 150 has been moved to the full unlatched open position. The stop tab 166 hits against the stop ledge 168 of the drive cam 105 and prevents it from rotating the convex ball valve 22 to an open position so long as the latch plate 150 is in an open "cocked" position. Shown for reference is the driven shaft 114 in a position when the coupling body 10' is inserted into the coupling body 10 but the latch plate 150 has not been released into a lock position. To lock the latch plate 150, the push button 164 would be pushed which would move the latch pin 152 out of the pin opening and release the latch plate 150 to move downward due to the action of the bias spring 170 and the smaller diameter opening 154 then extends into the latch groove 172 to lock the coupling body 10 into the coupling body 10'.

The present disclosure has been particularly shown and described with reference to the foregoing illustrations, which are merely illustrative of the best modes for carrying out the disclosure. It should be understood by those skilled in the art that various alternatives to the illustrations of the disclosure described herein may be employed in practicing the disclosure without departing from the spirit and scope of the disclosure as defined in the following claims. It is intended that the following claims define the scope of the disclosure and that the method and apparatus within the scope of these claims and their equivalents be covered thereby. This description of the disclosure should be understood to include all novel and non-obvious combinations of elements described herein, and claims may be presented in this or a later application to any novel and non-obvious combination of these elements. Moreover, the foregoing illustrations are illustrative, and no single feature or element is essential to all possible combinations that may be claimed in this or a later application.

I claim:

1. A quick connect coupling comprising:
   a first ball valve contained within a first coupling body;
   a second ball valve contained within a second coupling body where said first ball valve and said second ball valve can be substantially sequentially rotated from a closed position to an open position within said first and second coupling bodies respectively;
   a drive disc rotatably connected to said first ball valve;
   a driven disc rotatably connected to said second ball valve;
   an activation handle extending from said first drive disc;
   a segment of drive gear teeth formed on said drive disc;
   a segment of driven gear teeth formed on said driven disc, said driven gear teeth formed to mesh with said drive gear teeth, where said drive gear teeth are positioned on said drive disc and said driven gear teeth are positioned on said driven disc so that said drive gear teeth mesh with said driven gear teeth when said first ball valve is in substantially open position and said second ball valve is between open and closed positions.

2. The quick connect coupling of claim 1 further comprising a handle lock mounted to said handle for preventing said handle from being rotated when said first coupling body is not attached to said second coupling body.

3. The quick connect coupling of claim 1 further comprising a check ball held in said handle, said check ball spring loaded to extend outward from said handle.

4. The quick connect coupling of claim 3 further comprising a base plate, said base plate having at least one depression detent for receiving said spring loaded check valve.

5. The quick connect coupling of claim 1 further comprising a base plate, said base plate having at least one detent ledge, and a lock pin held within and extending from said handle, said lock pin extending to couple said handle with said drive disc until said lock pin drops across said plate ledge.

6. The quick connect coupling of claim 1 further comprising a plate lock where said plate lock has an opening having a larger diameter and an opening having a smaller diameter where said larger diameter opening overlaps with said smaller diameter opening.

7. The quick connect coupling of claim 6 further comprising a lock pin slidably attached to said first coupling body where said pin engages said lock plate.

8. The quick connect coupling of claim 7 where said lock pin engages said lock plate when said lock plate is in an open position.

9. The quick connect coupling of claim 8 where said lock pin is biased towards said lock plate.

10. A quick connect coupling comprising:
    a first ball valve contained within a first coupling body;
    a second ball valve contained within a second coupling body where said first ball valve and said second ball valve can be substantially sequentially rotated from a closed position to an open position within said first and second coupling bodies respectively;
    a drive disc rotatably connected to said first ball valve;
    a driven disc rotatably connected to said second ball valve;
    an activation handle extending from said first drive disc having a handle lock pin;
    a segment of drive gear teeth formed on said drive disc;
    a segment of driven gear teeth formed on said driven disc, said driven gear teeth formed to mesh with said drive gear teeth, where said drive gear teeth are positioned on said drive disc and said driven gear teeth are positioned on said driven disc so that said drive gear teeth mesh with said driver driven gear teeth when said first ball valve is in substantially open position and said second ball valve is between open and closed positions; and
    wherein said handle lock pin couples said drive disc to said first ball valve when said first ball valve is in said closed position until rotated into said open position.

11. The quick connect coupling of claim 10 further comprising a lock plate for locking said first coupling body to said second coupling body, said lock plate having a larger diameter opening overlapping a smaller diameter opening where said larger diameter opening allows either said first or second coupling body to pass therethrough and where said smaller diameter opening engages a slot formed in either the first or second coupling body.

12. The quick connect coupling of claim 11 further comprising a spring for biasing said lock plate towards a locked position.

13. The quick connect coupling of claim 10 wherein said handle lock pin is spring biased.

* * * * *

UNITED STATES PATENT AND TRADEMARK OFFICE
CERTIFICATE OF CORRECTION

PATENT NO. : 8,662,108 B2
APPLICATION NO. : 13/030763
DATED : March 4, 2014
INVENTOR(S) : Haunhorst Page 1 of 1

It is certified that error appears in the above-identified patent and that said Letters Patent is hereby corrected as shown below:

In the Claims

Column 12, claim 10, line 36, delete "driver" before "driven"

Signed and Sealed this
Fourteenth Day of October, 2014

Michelle K. Lee
*Deputy Director of the United States Patent and Trademark Office*